US009524201B2

United States Patent
Samanta et al.

(10) Patent No.: US 9,524,201 B2
(45) Date of Patent: Dec. 20, 2016

(54) SAFE AND EFFICIENT DIRTY DATA FLUSH FOR DYNAMIC LOGICAL CAPACITY BASED CACHE IN STORAGE SYSTEMS

(71) Applicant: Avago Technologies General IP (Singapore) Pte. Ltd, Singapore (SG)

(72) Inventors: Sumanesh Samanta, Bangalore (IN); Srikanth Krishnamurthy Sethuramachar, Bangalore (IN); Ramkumar Venkatachalam, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 172 days.

(21) Appl. No.: 14/466,124

(22) Filed: Aug. 22, 2014

(65) Prior Publication Data

US 2015/0370715 A1    Dec. 24, 2015

(30) Foreign Application Priority Data

Jun. 19, 2014   (IN) .............................. 666KOL2014

(51) Int. Cl.
| | | |
|---|---|---|
| *G06F 12/02* | (2006.01) | |
| *G06F 11/00* | (2006.01) | |
| *G06F 12/08* | (2016.01) | |

(52) U.S. Cl.
CPC .......... *G06F 11/00* (2013.01); *G06F 12/0891* (2013.01)

(58) Field of Classification Search
CPC .............................. G06F 11/00; G06F 12/0891
USPC .......................................................... 711/113
See application file for complete search history.

(56) References Cited

U.S. PATENT DOCUMENTS

| | | | |
|---|---|---|---|
| 7,085,895 B2 | 8/2006 | Kishi | |
| 2001/0001872 A1* | 5/2001 | Singh .................. | G06F 12/0802 711/129 |
| 2004/0193782 A1* | 9/2004 | Bordui ................ | G06F 12/0804 711/103 |
| 2005/0055512 A1* | 3/2005 | Kishi .................. | G06F 12/0804 711/135 |

OTHER PUBLICATIONS

Fred Douglis, The Compression Cache: Using On-line Compression to Extend Physical Memory, Winter 1993 USENIX Conference, Jan. 1993, pp. 519-529.

* cited by examiner

*Primary Examiner* — Jae Yu

(57) ABSTRACT

Systems and methods to safely and efficiently handle dirty data flush are disclosed. More specifically, when a cache controller determines that one (or more) storage device of a cache device is running out of space, that storage device is given priority to be flushed prior to the other storage devices that are not in such a critical condition. In addition, a cache bypass process can be conditionally enabled to save free physical spaces already running low on such critical cache storage devices.

20 Claims, 3 Drawing Sheets

No Compression

With Compression

SAFE AND EFFICIENT DIRTY DATA FLUSH FOR DYNAMIC LOGICAL CAPACITY BASED CACHE IN STORAGE SYSTEMS

TECHNICAL FIELD

The present invention relates to the field of data storage and particularly to dirty data flush techniques utilized in data storage systems.

BACKGROUND

A data storage device is a device for storing data. A hard disk drive (HDD) is a data storage device used for storing and retrieving digital information using rapidly rotating disks (platters) coated with magnetic material. A solid-state drive (SSD) is a data storage device using integrated circuit assemblies as memory to store data persistently.

SUMMARY

Accordingly, an embodiment of the present disclosure is directed to a data flushing method. The method includes: identifying a cache window to be flushed from a cache, wherein the cache includes a plurality of cache storage devices; determining whether at least one cache storage device of the plurality of cache storage devices is in a critical condition; determining whether the cache window to be flushed resides on said at least one cache storage device in the critical condition; flushing the cache window from the cache when the cache window resides on said at least one cache storage device in the critical condition; and postponing flushing of the cache window when the cache window does not reside on said at least one cache storage device in the critical condition.

A further embodiment of the present disclosure is also directed to a data flushing method. The method includes: identifying a cache window to be flushed from a cache, wherein the cache includes a plurality of cache storage devices; determining whether at least one cache storage device of the plurality of cache storage devices is in a critical condition; enabling cache bypass for said at least one cache storage device in the critical condition, wherein the cache bypass prohibits creation of a new cache window on said at least one cache storage device in the critical condition; determining whether the cache window to be flushed resides on said at least one cache storage device in the critical condition; flushing the cache window from the cache when the cache window resides on said at least one cache storage device in the critical condition; postponing flushing of the cache window when the cache window does not reside on said at least one cache storage device in the critical condition; and disabling the cache bypass for said at least one cache storage device when said at least one cache storage device is no longer in the critical condition.

An additional embodiment of the present disclosure is directed to a computer storage apparatus. The computer storage apparatus includes a plurality of cache storage devices jointly forming a cache. The computer storage apparatus also includes a controller configured to control operations of the plurality of cache storage devices. The controller is configured to: identify a cache window to be flushed from the cache; determine whether at least one cache storage device of the plurality of cache storage devices is in a critical condition; determine whether the cache window to be flushed resides on said at least one cache storage device in the critical condition; flush the cache window from the cache when the cache window resides on said at least one cache storage device in the critical condition; and postpone flushing of the cache window when the cache window does not reside on said at least one cache storage device in the critical condition.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

In computing, data storage devices often use compression to store data and hence can typically store more data than their physical capacity. This leads to technology such as dynamic logical capacity, where a storage device (e.g., a solid state drive or the like) presents more logical capacity than its physical capability to a host device. Another technology, referred to as thin provisioning, involves using virtualization technology to allocate available storage spaces. Thin provisioning relies on on-demand allocation of blocks of data versus the traditional method of allocating all the blocks up front.

Figure 1:
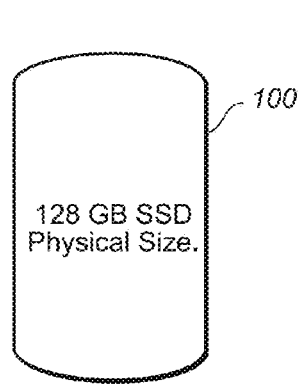
FIG. 1 is an illustration depicting a storage device.
Figure 2:
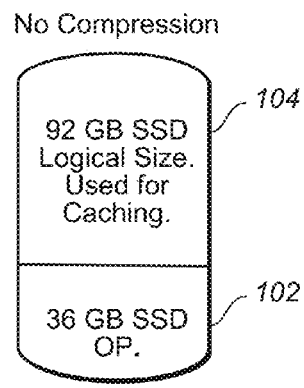
FIG. 2 is an illustration depicting space allocation of the storage device.
Figure 3:
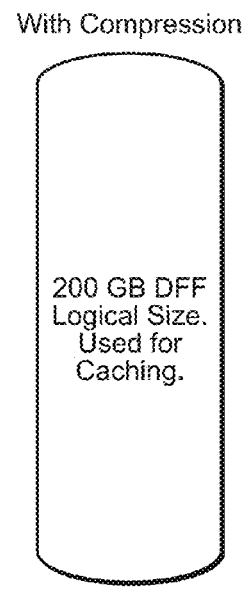
FIG. 3 is an illustration depicting space allocation of the storage device with logical capacity allocation.

It is noted that both compression-based logical capacity allocation techniques, thin provisioning-based logical capacity allocation techniques, and the combination of such techniques, can be utilized to give the appearance of having more resources (i.e., logical capacity) than physically available. For illustrative the purposes, FIG. 1 depicts the physical capacity of an exemplary storage device 100 (e.g., a solid state drive or the like). FIG. 2 depicts the reserved space 102 (e.g., reserved for over-provisioning or other reasons) and the allocatable storage space 104 that can be presented to a host device if no compression or thin provisioning-based logical capacity allocation technique is used. FIG. 3 depicts the logical capacity presentable to the host device if the storage device 100 implements, for example, the compression-based logical capacity allocation technique.

Figure 4:
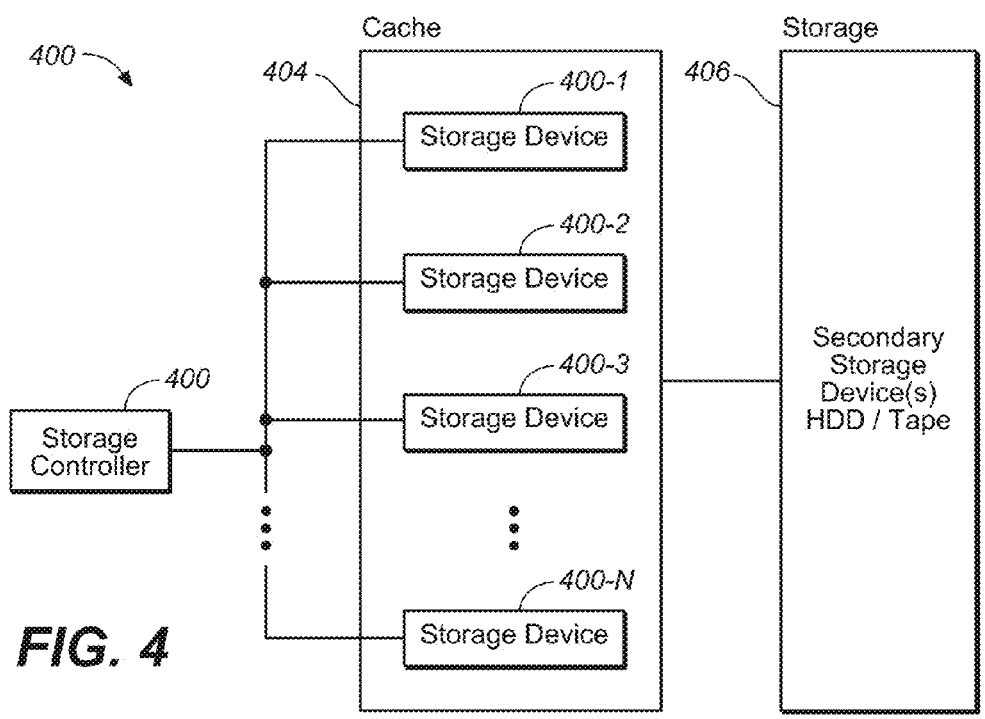
FIG. 4 is a block diagram depicting a storage system.

It is contemplated that one or more of such storage devices can be utilized for caching purposes. For example, as illustrated in FIG. 4, multiple storage devices 400-1 through 400-N possibly of various different types jointly form a cache 404, which can be utilized to cache data for secondary storage devices 406 (e.g., hard disks, type drives or the like) of the storage system 400. It is contemplated that cache 404 can be used as the primary cache of the storage system 400. It is understood, however, that in certain systems that utilize more than one level of caching, cache 404 as depicted in FIG. 4 can also be utilized as a secondary cache.

More specifically, this cache 404 comprises N distinct storage devices denoted 400-1, 400-2, . . . 400-N, one or more of which may be random access memories (e.g., RAM or DRAM), solid state drives (e.g., flash drives) or the like. Furthermore, one or more of these storage devices may be configured to implement the compression or thin provisioning-based logical capacity allocation techniques in order to present more logical cache capacity than the storage devices 400-1 through 400-N physically provides.

Typically, a cache is managed in units referred to as cache windows (may also be referred to as caching units). Cache windows are basically units of logical block addressing (LBA) ranges, which are used for specifying locations of blocks of data stored in the secondary storage devices 406. In certain implementations, the cache windows are fixed size LBA ranges, and a valid and dirty bitmap is typically associated with each cache window and is used to track/indicate whether the cache window is valid and whether it is dirty. In certain implementations, the bitmap can also track/indicate which LBAs in the cache window are valid and/or dirty. It is noted that a typically cache window has a size of 1 MB to 4 MB, but the specific size may vary without departing from the spirit and scope of the present disclosure.

Generally, when dirty data on these storage devices 400-1 through 400-N exceeds a maximum dirty threshold limit, a flush process is invoked to flush the dirty data from the cache 404 to the secondary storage devices 406. This flush process is also invoked when free (unutilized) physical capacity on one or more storage devices 400-1 through 400-N drops below a minimum threshold, in which case the dirty data needs to be first flushed and the space can then be reclaimed.

In conventional flush processes, a data structure such as a self-balancing binary search tree or the like is used to keep track of the dirty cache windows that need to be flushed. Conventional flush processes sort these dirty cache windows based on the LBAs they correspond to. While this LBA-based sorting helps generating sequential input/output to the secondary storage devices 406, it does not take into consideration the location of the dirty cache windows on the caching device 404. It is noted that this may be problematic if one (or more) of the storage devices, 400-1 for example, is quickly running out of physical spaces, which ideally should be given priority to be flushed first, but because the sorting algorithm is solely based on the destination addresses (i.e., locations of data stored in the secondary storage devices 406), storage device 400-1 may have to wait for its turn regardless of the fact that it is running out of space. In addition, after the data is flushed, another process that is used to actually reclaim the flushed space (e.g., a trim command for a solid-state drive) is a very time consuming process. The storage device 400-1 may therefore need to wait for a long time for its turn to flush its dirty data and reclaim its available spaces.

Furthermore, in certain cases, if the host device continues sending input/output (IO) requests to the storage system 400, the incoming IO can result in exceeding physical capacity of the storage device 400-1 and lead to catastrophic failures. This problem is very likely to occur if one or more of the storage devices 400-1 through 400-N implements compression-based logical capacity allocation techniques, as data compression rate may vary and a storage device already running low on its physical space may run completely out of its physical space without warning.

Embodiments of the present disclosure are directed to systems and methods to safely and efficiently handle dirty data flush without the aforementioned shortcomings. More specifically, when the controller 402 determines that one (or more) storage device of the cache device 404 is running out of space (i.e., its physical capacity drops below a minimum threshold), that storage device is given priority to be flushed prior to the other storage devices that are not in such a critical stage. In addition, the space occupied by the flushed data is reclaimed immediately after that data is flushed, allowing the critical storage device to reclaim its available spaces as soon as possible.

Figure 5:
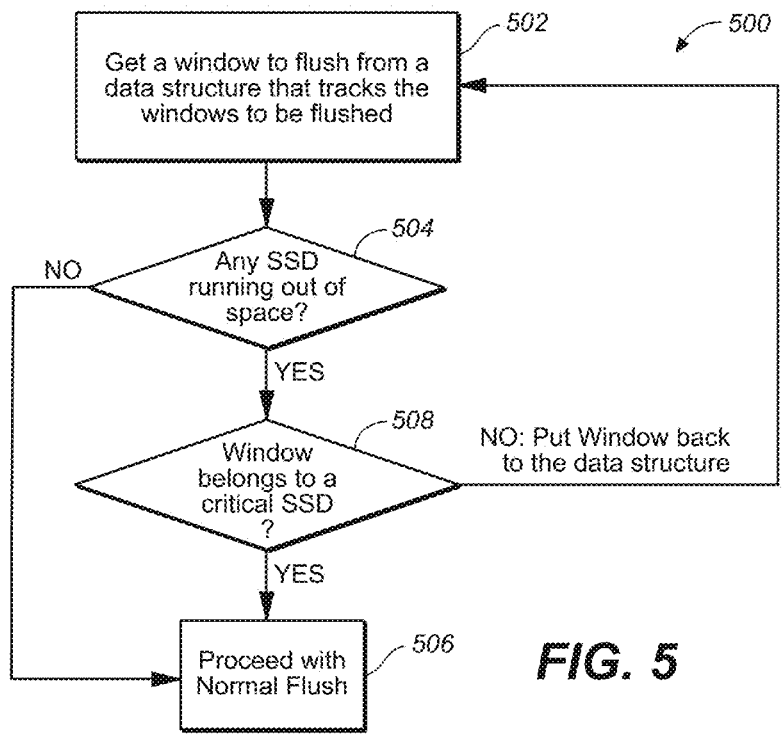
FIG. 5 is a flow diagram depicting a cache window aware flush process.

Referring to FIG. 5, a cache window aware flush process 500 is shown. This flush process 500 takes into account the location of the cache window on the cache device 404, along with the locations of source data stored in the secondary storage devices 406, to prioritize the flush order. As shown in FIG. 5, conventional data structures such as a binary search tree or the like can still be used to keep track of the dirty cache windows that need to be flushed in step 502. As previously mentioned, the data structure used to keep track of the dirty cache windows may sort the cache windows based on the source addresses that these windows corresponds to. The cache window aware flush process 500 does not need to alter this sorting process.

However, instead of performing data flush solely based on the order that is provided by destination address based sorting, the cache window aware flush process 500 needs to also determine whether any of the cache storage devices 400-1 through 400-N is in a critical condition (e.g., if its free physical capacity drops below a minimum threshold) in step 504 and react accordingly. If none of the cache storage devices 400-1 through 400-N is in a critical condition, the process proceeds normally and the cache windows that need to be flushed (as identified by the data structure) is flushed in step 506. On the other hand, if one or more of the cache storage devices 400-1 through 400-N is in a critical condition, an additional prioritization step is taken.

More specifically, the cache window aware flush process 500 needs to determine in step 508 whether the particular cache window to be flushed, as identified in step 502, belongs to one of the cache storage devices that is in a critical condition. If that particular cache window does belong to one of such critical cache storage devices, that particular cache window can be flushed. Otherwise, if that particular cache window does not belong to any of the critical cache storage devices, that particular cache window should be postponed and put back to the data structure to be processed later. In this manner, cache windows that belong to critical cache storage devices are flushed as soon as possible.

It is contemplated that the cache window aware flush process 500 as described above may be invoked for the purpose of reclaiming available spaces from one or more cache storage devices. This cache window aware flush process 500 does not need to be invoked if the flush process is triggered for reasons other than reclaiming available spaces (e.g., if dirty data exceeds a maximum dirty threshold limit). It is understood, however, that the cache window aware flush process 500 is still applicable in such use cases without departing from the spirit and scope of the present disclosure.

It is also contemplated that if only a subset of the cache storage devices 400-1 through 400-N implements the compression or thin provisioning-based logical capacity allocation techniques, steps 504 and 508 may selectively limit their determinations only to that subset of cache storage devices. That is, step 504 may determine whether any of the compression or thin provisioning-based cache storage devices is in a critical condition, and step 508 may determine whether the next cache window to be flushed, as identified by the data structure, belongs to any of the compression or thin provisioning-based cache storage devices that is in a critical condition. In this manner, no special rule is defined for the cache storage devices that does not implement the compression or thin provisioning-based logical capacity allocation techniques; normal flush operations are applied for these cache storage devices with the exception that cache windows from these drives may need to wait while windows from critical devices are being flushed with priority.

In certain embodiments, a cache storage device is considered to be in a critical condition when a free physical space available on that particular cache storage device is below a threshold. Alternatively/additionally, for a cache storage device that implements compression or thin provisioning techniques, that particular cache storage device is determined to be in the critical condition when a free physical space available on that particular cache storage device is below a threshold and the exposed space of the physical device is more than the physical space. In this manner, if a cache storage device that implements compression or thin provisioning techniques exposes the same amount of space as its physical capacity, it is not deemed to be in a critical condition, even when the physical space goes below threshold.

It is further contemplated that while the cache window aware flush process 500 as described above addresses the output side of the flush process (i.e., data going out of the cache 404), the input side of the process (i.e., IO requests coming into the cache 404) may also be improved to make the flush process safer and even more efficient. For instance, certain embodiments of the present disclosure utilize a bypass process 600 as depicted in FIG. 6.

Figure 6:
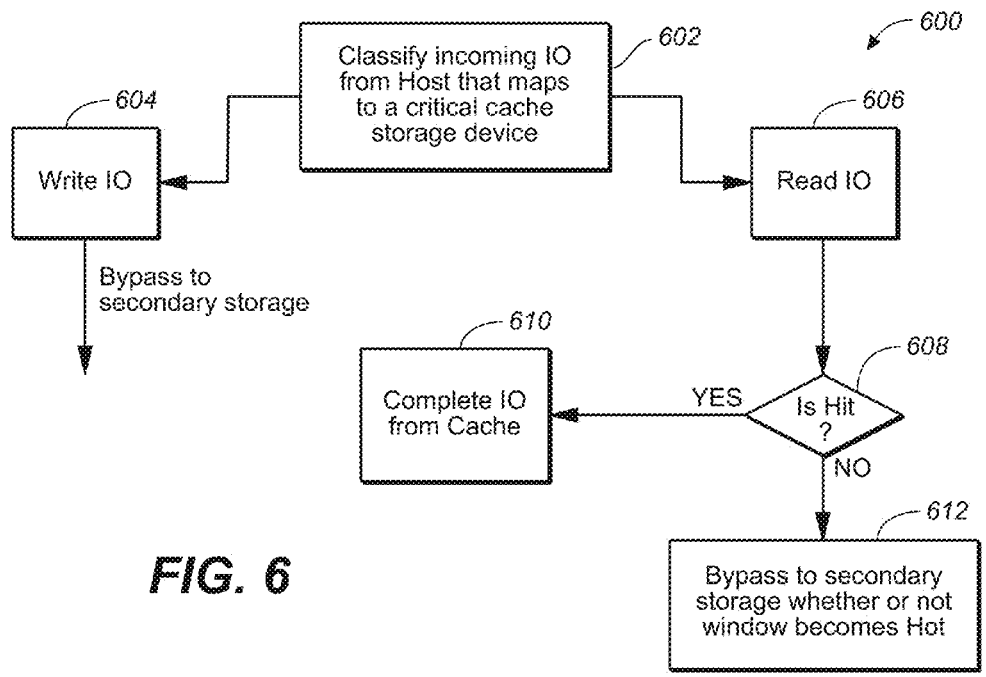
FIG. 6 is a flow diagram depicting a cache bypass process.

More specifically, as illustrated in FIG. 6, if an IO request is destined to a critical cache storage device, the bypass process 600 first determines whether this IO request is a write IO or a read IO in step 602. Any write IO destined to a critical cache storage device should bypass the cache 404 as indicated in step 604 and sent directly to the secondary storage devices 406. This will make sure that no new write IO hits the critical cache storage device, but is instead directly written onto the secondary storage devices 406. The cached data stored in the critical cache storage device should be invalidated accordingly. It is noted that bypassing write IO saves free physical spaces already running low on such critical cache storage devices.

If the IO request is a read IO 606, the bypass process 600 should determine whether a cache hit occurs in step 608. The read IO can be served from the cache in step 610 only if a full cache hit occurs. For partial hits, the portion of the data the resides in the cache may be serviced, but the portion of the data that is read from the secondary storage cannot be cached to prevent any writing operations to the cache. If cache misses, the read IO should bypass the critical cache storage device as indicated in step 612 and read data directly from the secondary storage devices 406. It is noted that under the bypass process 600, no new window is allowed to be created on the critical cache storage devices, regardless of whether the window should be cached or not under a normal cache policy, which is now bypassed to save free physical spaces already running low on such critical cache storage devices.

Figure 7:
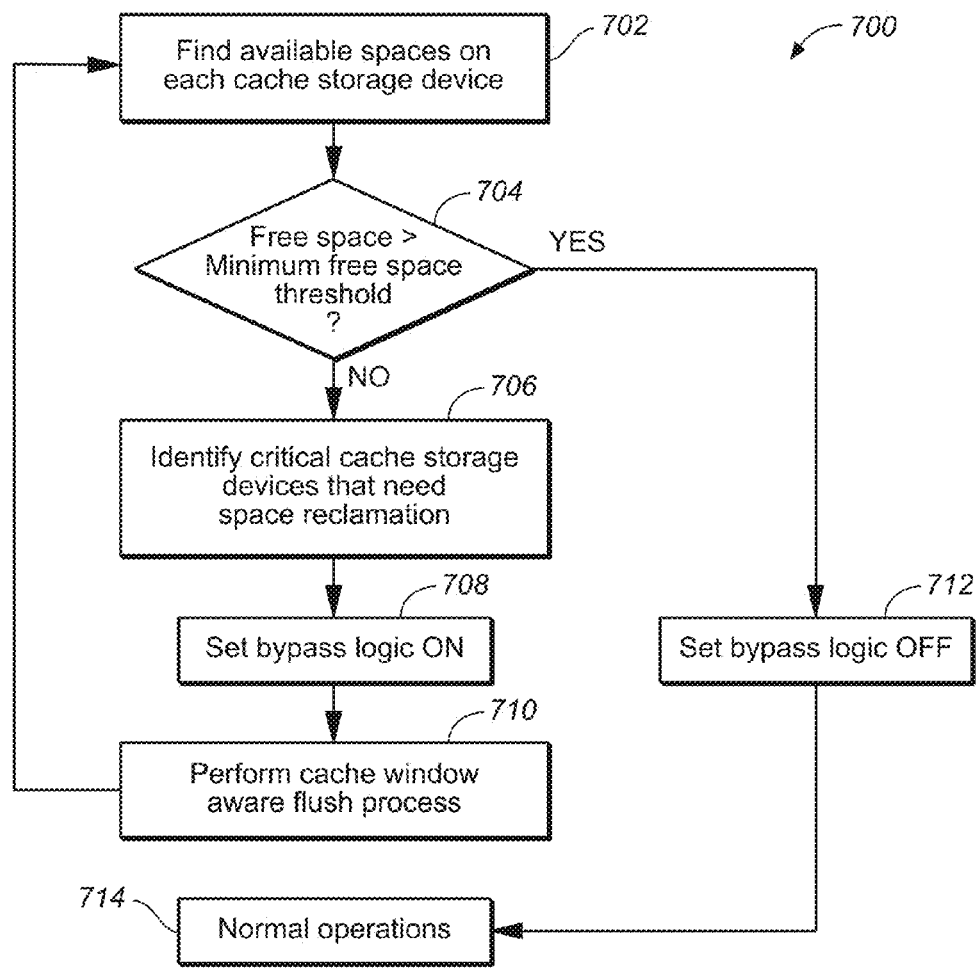
FIG. 7 is a flow diagram depicting a method utilizing the cache window aware flush process in conjunction with the cache bypass process.

FIG. 7 is a flow diagram illustrating a method 700 utilizing the cache window aware flush process 500 in conjunction with the bypass process 600 as described above. As illustrated in FIG. 7, a controller can determine the free spaces left on each of the cache storage devices through an inquiry command in step 702. If it is determined in step 704 that the available free space left on a particular cache storage device is below a minimum threshold, that cache storage device is identified in step 706 as a critical cache storage device. Subsequently, for each particular critical cache storage device, the number of cache windows that needs to be reclaimed in order to make that particular cache storage device non-critical (i.e., having physical free capacity above the minimum threshold) can be calculated. It is contemplated that if more than one cache storage device is in critical condition, their relative criticality can be determined based on the number of cache windows they need to reclaim, and they can be further prioritized so that the most critical cache storage device is processed first.

Once the critical storage device(s) are identified, the bypass process as previously described (process 600) can be invoked in step 708. To reiterate, with the bypass process enabled, any new IOs whose cache data region is targeting a critical storage device, that critical storage device is bypassed and no new cache window can be allocated. For write IOs, they should be directed to the secondary storage devices and bypass the cache entirely. In addition, if any (non-dirty) cache window is already allocated in that critical storage device, that cache window should be invalidated and freed. For read IOs, only cache hits are serviced; cache misses are directed to the secondary storage devices and the data will not be cached regardless of whether the data should be cached or not under a normal cache policy.

Subsequently, the cache window aware flush process as previously described (process 500) can be invoked in step 710. To reiterate, the cache window aware flush process takes into account the location of the cache window on the cache device and prioritize the flush order so that the most critical cache storage devices are flushed first. Once the flush is completed, the process that is used to actually reclaim the flushed space (e.g., a trim command for a solid-state drive) follows immediately so that space can be freed and reclaimed on that cache storage device.

Once it is determined that all cache storage devices are in non-critical condition (with enough physical space), the bypass process can be disabled in step 712 and normal operations (including normal flush operations) can resume in step 714.

It is contemplated that while the descriptions above reference solid state drives as the cache storage devices, such a configuration is merely exemplary. Systems and methods in accordance with embodiments of the present disclosure are applicable to other types of storage devices without departing from the spirit and scope of the present disclosure. In addition, while the systems and methods in accordance with embodiments of the present disclosure are particularly useful to avoid catastrophic failures that may occur in a cache device where one or more storage devices utilized by the cache implement compression or thin provisioning-based logical capacity allocation techniques, implementations of such logical capacity allocation techniques are not required.

It is also contemplated that the flush methods described above can be utilized in a solid state drive, a hybrid drive, or a part of a higher level system, such as a RAID (redundant array of inexpensive storage devices or redundant array of independent storage devices) based cache system. Such a RAID cache system increases stability and reliability through redundancy, combining multiple storage devices as a logical unit. Data may be spread across a number of storage devices included in the RAID cache system according to a variety of algorithms and accessed by an operating system as if it were a single cache device.

As mentioned previously, the storage device configuration can be varied in other embodiments of the invention. For example, the storage device may comprise a hybrid hard disk drive which includes a flash memory in addition to one or more storage disks. In addition, storage device may be coupled to or incorporated within a host processing device, which may be a computer, server, communication device, etc.

It should again be emphasized that the above-described embodiments of the invention are intended to be illustrative only. For example, other embodiments can use different types and arrangements of storage disks, read/write heads, read channel circuitry, signal processing circuitry, decoders, filters, detectors, and other storage device elements for implementing the described error correction functionality. Also, the particular manner in which certain steps are performed in the signal processing may vary. Further, although embodiments of the invention have been described with respect to storage disks such as solid state drives, embodiments of the invention may be implemented various other devices including optical data-storage applications and wireless communications. These and numerous other alternative embodiments within the scope of the following claims will be apparent to those skilled in the art.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
   identifying a cache window to be flushed from a cache, wherein the cache includes a plurality of cache storage devices;
   determining whether at least one cache storage device of the plurality of cache storage devices is in a critical condition, wherein a particular cache storage device is determined to be in the critical condition when a free physical space available on that particular cache storage device is below a threshold and an exposed logical space of the particular cache storage is greater than the free physical space available on that particular cache storage device;
   determining whether the cache window to be flushed resides on said at least one cache storage device in the critical condition;
   flushing the cache window from the cache when the cache window resides on said at least one cache storage device in the critical condition; and
   postponing flushing of the cache window when the cache window does not reside on said at least one cache storage device in the critical condition.

2. The method of claim 1, further comprising:
   flushing the cache window from the cache normally when it is determined that none of the plurality of cache storage devices is in a critical condition.

3. The method of claim 1, wherein the plurality of cache storage devices includes solid state drives.

4. The method of claim 1, wherein at least one cache storage device of the plurality of cache storage device implements a thin provisioning-based logical capacity allocation technique.

5. The method of claim 1, wherein at least one cache storage device of the plurality of cache storage devices implements a compression-based logical capacity allocation technique.

6. The method of claim 1, wherein the cache window to be flushed is identified utilizing a data structure configured for tracking dirty cache windows, and wherein the dirty cache windows are sorted based on their destination addresses corresponding to a secondary storage device.

7. A method, comprising:
   identifying a cache window to be flushed from a cache, wherein the cache includes a plurality of cache storage devices;
   determining whether at least one cache storage device of the plurality of cache storage devices is in a critical condition;
   enabling cache bypass for said at least one cache storage device in the critical condition, wherein the cache bypass prohibits creation of a new cache window on said at least one cache storage device in the critical condition, and wherein when the cache bypass for said at least one cache storage device is enabled, a read request to said at least one cache storage device is serviced from the cache only when a full cache hit occurs;
   determining whether the cache window to be flushed resides on said at least one cache storage device in the critical condition;
   flushing the cache window from the cache when the cache window resides on said at least one cache storage device in the critical condition;
   postponing flushing of the cache window when the cache window does not reside on said at least one cache storage device in the critical condition; and disabling the cache bypass for said at least one cache storage device when said at least one cache storage device is no longer in the critical condition.

8. The method of claim 7, wherein the plurality of cache storage devices includes solid state drives.

9. The method of claim 7, wherein a particular cache storage device is determined to be in the critical condition when a free physical space available on that particular cache storage device is below a threshold and an exposed logical space of the particular cache storage is greater than the free physical space available on that particular cache storage device.

10. The method of claim 7, wherein at least one cache storage device of the plurality of cache storage devices implements a compression-based logical capacity allocation technique.

11. The method of claim 7, wherein the cache window to be flushed is identified utilizing a data structure configured for tracking dirty cache windows, and wherein the dirty cache windows are sorted based on their destination addresses corresponding to a secondary storage device.

12. The method of claim 7, wherein when the cache bypass for said at least one cache storage device is enabled, a write request to said at least one cache storage device is redirected to a secondary storage device.

13. The method of claim 7, wherein the cache window comprises units of logical block addressing ranges, which are used for specifying locations of block of data stored in a secondary storage device.

14. The method of claim 7, wherein when the cache bypass for said at least one cache storage device is enabled, a read request to said at least one cache storage device is redirected to a secondary storage device when a full cache hit does not occur, and no cache window is created on said at least one cache storage device in response to the read request.

15. A computer storage apparatus, comprising:
a plurality of cache storage devices jointly forming a cache; and
a controller configured to control operations of the plurality of cache storage devices, wherein the controller is configured to:
identify a cache window to be flushed from the cache;
determine whether at least one cache storage device of the plurality of cache storage devices is in a critical condition, wherein a particular cache storage device is determined to be in the critical condition when a free physical space available on that particular cache storage device is below a threshold and an exposed logical space of the particular cache storage is greater than the free physical space available on that particular cache storage device;
determine whether the cache window to be flushed resides on said at least one cache storage device in the critical condition;
flush the cache window from the cache when the cache window resides on said at least one cache storage device in the critical condition; and
postpone flushing of the cache window when the cache window does not reside on said at least one cache storage device in the critical condition.

16. The computer storage apparatus of claim 15, wherein the controller is further configured to enable cache bypass for said at least one cache storage device in the critical condition, wherein the cache bypass prohibits creation of a new cache window on said at least one cache storage device in the critical condition.

17. The computer storage apparatus of claim 15, wherein the controller is further configured to disable the cache bypass for said at least one cache storage device when said at least one cache storage device is no longer in the critical condition.

18. The computer storage apparatus of claim 15, wherein at least one cache storage device of the plurality of cache storage device implements a thin provisioning-based logical capacity allocation technique.

19. The computer storage apparatus of claim 15, wherein the plurality of cache storage devices includes solid state drives.

20. The computer storage apparatus of claim 19, wherein at least one cache storage device of the plurality of cache storage devices implements a compression-based logical capacity allocation technique.

* * * * *